United States Patent
Williams

[11] Patent Number: 6,118,892
[45] Date of Patent: Sep. 12, 2000

[54] METHOD FOR AUTOMATIC DETECTION OF REGION OF INTEREST FOR DIGITAL X-RAY DETECTORS USING A FILTERED HISTOGRAM

[75] Inventor: Cornell L. Williams, Pennsauken, N.J.

[73] Assignee: Direct Radiography Corp., Newark, Del.

[21] Appl. No.: 09/196,391

[22] Filed: Nov. 19, 1998

[51] Int. Cl.$^7$ ........................................... G06K 9/00
[52] U.S. Cl. ..................... 382/132; 382/168; 382/172
[58] Field of Search ........................ 382/128, 132, 382/168, 170, 171, 274, 172; 378/98, 98.2, 98.5, 98.12; 250/581, 583, 584, 587

[56] References Cited

U.S. PATENT DOCUMENTS

| | | | |
|---|---|---|---|
| 4,599,742 | 7/1986 | Kikuchi et al. | 378/99 |
| 4,833,625 | 5/1989 | Fisher et al. | 364/518 |
| 4,868,651 | 9/1989 | Chou et al. | 358/111 |
| 4,914,295 | 4/1990 | Shimura et al. | 250/327.2 |
| 5,029,226 | 7/1991 | Klein et al. | 382/50 |
| 5,046,118 | 9/1991 | Ajewole et al. | 382/51 |
| 5,164,993 | 11/1992 | Capozzi et al. | 382/6 |
| 5,268,967 | 12/1993 | Jang et al. | 382/6 |
| 5,388,138 | 2/1995 | Fujiwara | 378/108 |
| 5,574,764 | 11/1996 | Granfors et al. | 378/98.7 |
| 5,596,654 | 1/1997 | Tanaka | 382/168 |
| 5,606,587 | 2/1997 | Barski et al. | 378/62 |
| 5,633,511 | 5/1997 | Lee et al. | 382/132 |
| 5,641,267 | 6/1997 | Proctor et al. | 415/173.1 |
| 5,757,022 | 5/1998 | Kobayashi et al. | 250/587 |
| 5,903,660 | 5/1999 | Huang et al. | 382/132 |
| 5,982,916 | 11/1999 | Kuhn | 382/132 |
| 6,018,590 | 1/2000 | Gaborski | 382/132 |

FOREIGN PATENT DOCUMENTS

WO 98/37738  8/1998  WIPO ............................. H05G 1/64

OTHER PUBLICATIONS

"Automatic Setting Functions for Image Density and Range in the FCR System." by N. Nakajima, H. Takeo, M. Ishida, and T. Nagate. Fuji Computed Radiography Technical Review No. 3, pp. 1–23, No Date.

*Primary Examiner*—Bhavesh Mehta
*Attorney, Agent, or Firm*—Ratner & Prestia

[57] ABSTRACT

A method for automatically forming a filtered subset of digital values from a first set of digital values corresponding to a plurality of picture elements representing a radiographic exposure of a subject for use in displaying a radiograph of said subject, the method comprising: (1) generating a first histogram of the first set of digital values; (2) generating an integral curve representing an integral of the first histogram; (3) identifying an inflection point and corresponding digital value $V_{peak1}$ on the first histogram integral where the integral curve first changes slope in a direction decreasing from the highest digital value; (4) calculating a parameter $V_{test} = V_{peak1} - AR$ wherein AR represents an anatomical range of the subject; (5) spatially dividing the first set of digital values into multiple block subsets of digital values, each block subset comprising digital values from a neighborhood of pixels consisting of a predetermined number of picture elements; (6) constructing a subset histogram representing the frequency of occurrence of digital values within each block subset; (7) determining a low point of each block subset, $BV_{low}$, corresponding to a predetermined low point of the subset histogram; (8) comparing each $BV_{low}$ to $V_{test}$; and (9) forming the filtered subset of digital values from the digital values of all the block subsets having $BV_{low}$ greater than $V_{test}$.

12 Claims, 7 Drawing Sheets

METHOD FOR AUTOMATIC DETECTION OF REGION OF INTEREST FOR DIGITAL X-RAY DETECTORS USING A FILTERED HISTOGRAM

BACKGROUND OF THE INVENTION

1. Field of the Invention

This invention relates to a method for automatically identifying a range of digital values representing an x-ray intensity distribution radiograph and more particularly to a method for identifying a range of digital values representing useful diagnostic image information.

2. Background of the Invention

In the field of digital medical imaging, particularly in direct radiography, radiation detectors that capture a portion of the incident radiation and convert it to an electronic charge are often used for image acquisition. The dynamic range of these devices can be made linear over a 10,000:1 range as compared to a 40:1 range for x-ray film. Because of this wide range of detectable exposures, the necessity of re-imaging a patient due to improper selection of exposure factors is virtually eliminated. With the decoupling of the acquisition media from the display device, however, it is necessary to develop a mapping function, often in the form of a look-up table (LUT), which will optimally render the image on the desired output medium (CRT display, film, reflection print).

In developing the optimal gray scale, it has been observed that several key factors contribute to the acceptability of the resulting image. First, it is desirable to present any unattenuated x-ray exposure regions as black background. Second, it is necessary to display different parts of the anatomy at a specific optical density, for example, it may be desirable to be able to perceive the skin-line in various exams, such as for exams of extremities. To be successful at meeting these requirements, one needs to identify the range of digital values representing all or a portion of the desired image features to display, as well as identify the intensity range of the background pixels. Having done this, an exam specific, gray scale algorithm can automatically make the necessary adjustments to ensure that both criteria are met.

The problem of background detection falls into the domain of medical image segmentation. Two general methodologies exist; 1) histogram analysis, and 2) spatial texture analysis (possible combined with gray level intensity information provided by the histogram). Of the first class of methods, U.S. Pat. No. 5,046,118, inventors Ajewole, et al., discloses a method which uses the concept of partial entropy to divide the histogram into a background region and a non-background region. U.S. Pat. No. 5,164,993, inventors Capozzi et al., refers to the latter method and uses it on both the linear and logarithmic histograms, with some additional provisions for conditions when the background point is found at the top of a peak. U.S. Pat. No. 5,596,654, issued to Tanaka et al. on Jan. 21, 1997, discloses a method for finding background and foreground (which are areas of an image that have received very little radiation due to the use of radiation limiting devices such as collimator blades) using a histogram divided into a number of sections by an automatic thresholding procedure. In Tanaka, a discriminant analysis, combined with information about the exam type, exposure technique and desired body portion to be displayed, is then used to adjust the separation points between the sections until the desired ranges for the foreground, object, and background regions are found.

As part of the second group methodologies, U.S. Pat. No. 5,268,967, inventors Jang et al., discloses a four step method which involves morphological edge detection, block classification, and block refinement.

The methods disclosed in Ajewole, Capozzi, and Tanaka, above, may not be useful when the background is varying in a nonuniform way or when multiple background peaks exist in the histogram of the image. The method disclosed in Jang is useful in certain applications but complex processing stages are involved which are time consuming. The texture analysis method is very slow when running in a software implementation and only modestly reliable. There is still need for a practical way to automatically consistently reproduce the correct gray scale of radiographs captured by radiation detectors which produce an electrical signal in response to radiation exposure, particularly in the case where background scatter as in the case of collimated exposures tends to produce undesirable images.

Therefore, it is an object of this invention to provide, prior to exam-specific processing, a method of automatically identifying the range of useful digital values representing the anatomical region of interest to be used for diagnostic display.

SUMMARY OF THE INVENTION

The present invention is a method for automatically forming a filtered subset of digital values from a first set of digital values corresponding to a plurality of picture elements representing a radiographic exposure of a subject for use in displaying a radiograph of said subject, the method comprising:

(1) Generating a first histogram of the first set of digital values.

(2) Generating an integral curve representing an integral of said first histogram.

(3) Identifying an inflection point on the first histogram integral where the integral curve first changes slope when traversing along the integral curve starting from a point of highest digital value in the direction of decreasing digital values and obtaining a digital value $V_{peak1}$ for the inflection point.

(4) Calculating a parameter $V_{test}=V_{peak1}-AR$ wherein AR represents an anatomical range of said subject.

(5) Spatially dividing the set of digital values into multiple block subsets of digital values, each block subset comprising digital values from a neighborhood of pixels consisting of a predetermined number of picture elements.

(6) Constructing a subset histogram representing the frequency of occurrence of digital values within each block subset.

(7) Determining a low point of each block subset, $BV_{low}$, corresponding to a predetermined low point of the subset histogram.

(8) Comparing each $BV_{low}$ to $V_{test}$, and (9) Forming said filtered subset of digital values from the digital values of all the block subsets having $BV_{low}$ greater than $V_{test}$.

The anatomical range AR may be either a preset constant or a variable wherein $AR=[100+\{(V_{peak}-V_{edge})-ARC_{ref}\}]$ wherein $ARC_{ref}$ is an experimentally derived constant representing a standard difference between $V_{peak}$ and $V_{edge}$ as a function of exam type, and wherein $V_{edge}$, is the point where the histogram frequency of occurrence first drops to a predetermined percentage of a preceding peak frequency of occurrence when traversing along the histogram starting from $V_{low}$ in the direction of increasing exposure.

The filtered subset of digital values may next be used for displaying on a display medium an image representing the radiograph by:

I) Storing in a memory a first normalized lookup table (LUT) representing a density transfer function for the display medium.

II) Storing in said memory a second LUT containing a plurality of experimentally determined constants characteristic of the type of image to be displayed.

III) Forming a filtered histogram, determining an integral thereof, and creating a curve of said integral, using the digital values from said filtered subset of digital values and determining on the filtered histogram integral curve, a low point, $V_{low}$, corresponding to a predetermined low percentage of the filtered histogram integral; identifying a point on the filtered histogram, $V_{edge}$, where the filtered histogram frequency of occurrence first drops to a predetermined percentage of a preceding peak frequency of occurrence when traversing along the filtered histogram starting from $V_{low}$ in the direction of increasing exposure; identifying a point on the filtered histogram integral curve, $V_{peak2}$, where the filtered histogram integral curve first changes slope when traversing along the filtered histogram integral curve starting from the point of highest exposure in the direction of decreasing exposure; and calculating a starting value $V_{min}$ and an ending value $V_{max}$ using a exam-specific equation containing said experimentally determined constants and one or more of the values $V_{low}$, $V_{peak2}$ and $V_{edge}$.

IV) Replacing all digital values in the filtered subset that are lower than $V_{min}$ with $V_{min}$, and all digital values that are higher than $V_{max}$ by $V_{max}$, and V) normalizing the digital values in the filtered subset to a new set of values representing the difference $V_{max}$-$V_{min}$ and using the normalized digital values and the first LUT to display the image.

The method steps may be tangibly embodied in program storage device as a program of instructions readable and executable by the machine to perform the method steps, particularly where such machine is a component of a digital radiography system

DETAILED DESCRIPTION OF THE INVENTION

In a typical direct image capture set up there is a source of imaging radiation which may be x-ray radiation, a patient, and a radiation detector. The patient is placed in the path of the radiation and the detector is also placed in the radiation path in a position to intercept the radiation after it has traversed the patient.

Direct radiation image capturing devices typically comprise a plurality of discreet sensors arrayed in a two dimensional array. The sensors generate an electrical signal whose magnitude is directly proportional to the intensity and duration of the radiation incident on the sensor.

The totality of the signals from the individual picture elements (PIXELS) are next read out usually in a prescribed sequence and, following amplification and noise filtering, the signals, typically analog signals at this point, are almost always converted to digital values representing the relative exposure of each sensor. The digital values are stored in a data storage medium referred to herein as a data bank. Storage is in a manner that permits the accurate two-dimensional reconstruction of the signal distribution captured on the array.

The information in the data bank is used for displaying a visual image of the original signal distribution in the form of a two-dimensional distribution of gray scale values, each value corresponding to the signal produced by each of the sensors in the array. These individual digital values form the picture elements that constitute the displayed image. A typical such radiation detector is disclosed in U.S. Pat. No. 5,648,660 issued to Lee et al. on Jul. 5, 1997, the contents of which are incorporated herein by reference.

To display the image, a particular display medium must be selected. Most common display media are the photosensitive film and the cathode ray tube. Photosensitive film may be exposed to an imagewise intensity modulated scanning light beam, while a CRT display is done by modulating in imagewise fashion the intensity of a phosphor exciting scanning beam of focused electrons. The technology for both types of display is well known in the art.

In order to display an image, the digital values are used to control the intensity of a light beam or an electron beam in a device which is able to receive a signal representing a digital value and produce a display driving signal. Current technology is widely available to convert digital input values to modulating voltages that modulate the beam intensity (or exposure time) of a luminous film exposing beam or the electron beam that impinges on the CRT phosphor to produce a visible image. What is important, of course, is the conversion of the digital values to particular signal strengths such that the resulting image will have a desired optical density appearance. This process is referred herein as mapping of the digital values representing the captured image onto the Gray Scale Transfer (GST) function of the display medium used. The GST function represents the resulting gray scale of the display medium as a function of, preferably, normalized input excitation, and is typically stored as an LUT.

In medical diagnostic image display applications it is desirable to reproduce as accurately as possible the appearance of a traditional radiograph. Typically, traditional HeNe laser film radiographs have a maximum optical density of about 3.0 and a fog level of about 0.2. Thus the useful density range is about 2.8. As optical density of films is typically expressed as a logarithm, the inverse log of 2.8 is about 600, so the desired range of useable gray levels is 600 to 1, or at most 1000 to 1. This means that the display gray scale range should strive to reproduce an optical density range of 600/1 or 1000/1. Or in different terms, there must be determined a digital value, $V_{min}$ that will be used to represent the first detectable shade of gray in the display, and a digital value $V_{max}$ that will be used to display the saturation point or the maximum black in the display. In addition, the remaining digital values between $V_{min}$ and $V_{max}$ should be spread out in a manner that will provide the most useful visual information in a desired gray range, compressing or expanding gray ranges based on the type of examination undertaken. This is obtained using a third digital value, $V_{edge}$ that is then used to place a particular density value at a predetermined point on the GST.

Co-pending application PCT/US98/03249, filed Feb. 20, 1998 and assigned to the assignee of the present application, discloses a method and related experimentally-determined, examination-specific algorithms and associated constants for use with the algorithms. This method may be applied to the digital data to determine $V_{min}$, $V_{max}$ and $V_{edge}$ and to display a radiograph.

Figure 1:
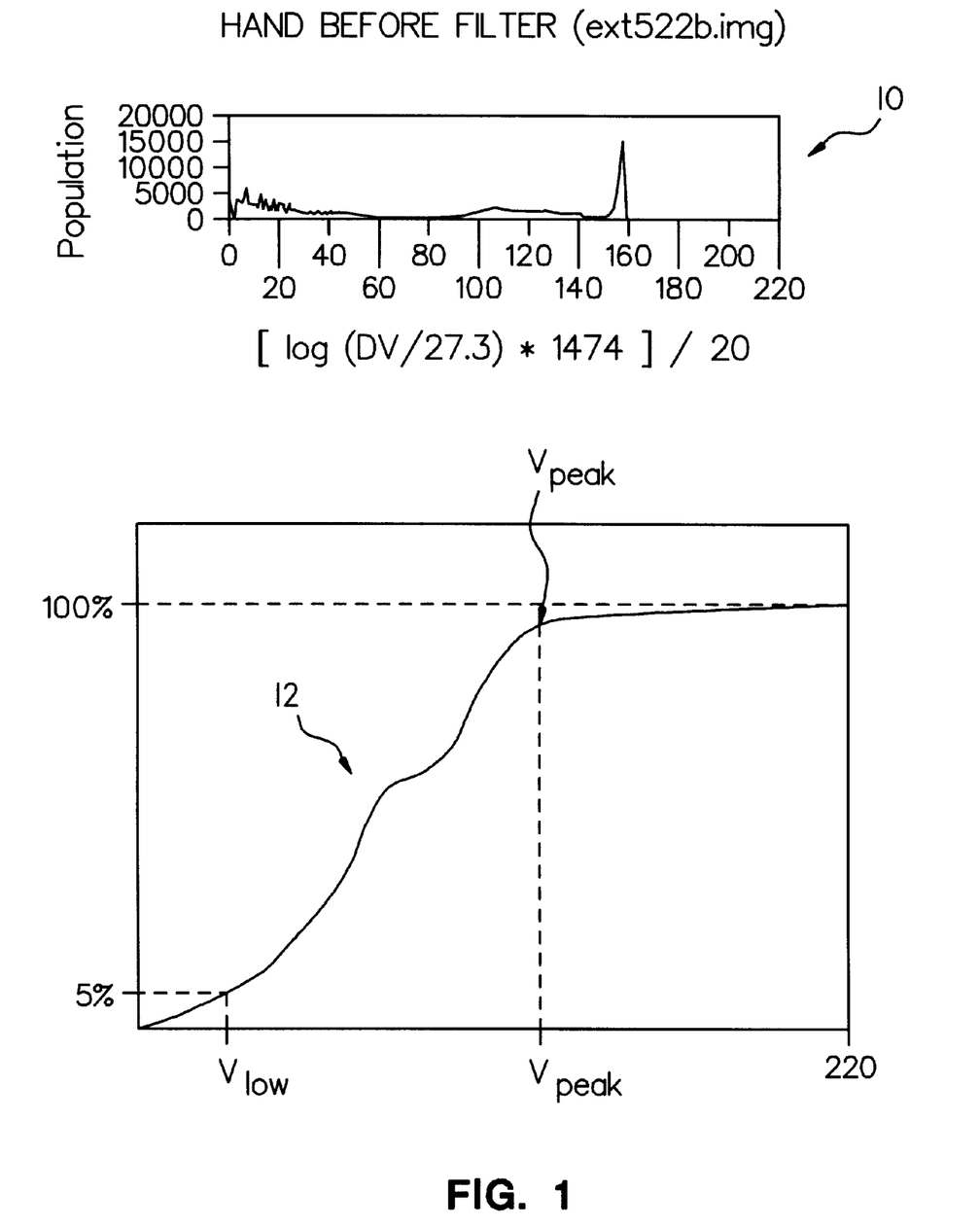
FIG. 1 shows a typical histogram and its integral for a collimated X-ray exposure of a hand prior to filtering according to this invention.

The examination-specific algorithms taught in the aforementioned pending application utilize extensive correlation of histogram data with anatomical landmarks to identify certain critical values and relationships, and uses these values to map the digital data in ways that are determined by the nature of the image captured and, in the case of radiographs, the type of examination desired. These anatomical landmarks are determined by exam-specific calculations, using three reference points common to all types of images and examinations. Referring now to FIG. 1, there is shown a typical histogram 10 and its integral 12 for a collimated X-ray exposure of a hand prior to filtering, to be used for illustrating the three reference points.

The first reference point is the beginning reference point $V_{low}$, which is used to calculate the minimum value $V_{min}$ that will be used for image display mapping. Identification of a beginning point can be rather indefinite if only the histogram frequency of occurrence values are used. Using the integral of the histogram values produces a more definitive value. The digital value ($V_{low}$) that corresponds to 1% to 10%, preferably 5% of the total integral has been selected as a reliable reference for calculating the initial digital value ($V_{min}$) for display purposes.

The second reference point is $V_{edge}$, where the histogram frequency of occurrence first drops to less than 20% to 30%, preferably less than 25%, of the preceding peak value on the histogram, traversing from the lowest exposure to the highest exposure (left to right in FIG. 1) from $V_{low}$. For example, in a PA chest image, $V_{edge}$ identifies the most x-ray translucent portion of the lung field and is used to produce a specified optical density in the hard copy image. As will be shown, the combination of a defined $V_{min}$ and a prescribed optical density for the lung field permits calculation of the $V_{max}$ value. In the case of a chest lateral view, the $V_{edge}$ represents the heart area and is used in our calculation of $V_{max}$ in lateral chest views.

The third reference point is $V_{peak}$, corresponding to the exposure value at which point the histogram integral curve changes slope, traversing from highest exposure to lowest exposure (right to left in FIG. 1). $V_{peak}$ represents the highest unsaturated peak value of the histogram. This value is useful in images where it is desirable to see a skin line.

Using the reference value $V_{low}$ derived from the histogram data, $V_{min}$ is calculated using an exam-specific constant A. Constant A is used to determine the distance below $V_{low}$ for the lowest digital value to be included in the image display. Constant A and an associated paired constant B are experimentally determined constants that are derived for different types of radiographic images, including without limitation, chest, extremities, skull, or abdomen, from a multiplicity of examinations.

$$V_{min}=V_{low}-SF\times\text{Log}(A)$$

The scale factor SF is related to the histogram construction. In the preferred mode, in constructing the histogram, rather than using the individual digital exposure values, bins containing a number of sequential values are used. For instance, if each bin includes 20 sequential digital values, 20 would be the bin size. Thus in a case where the digital system is a 12 bit system, there are 4096 discrete values which may be reduced to 205 by dividing the range into segments (bins) of 20 sequential values and plotting the frequency of occurrence of any value within a bin as single value.

The scale factor is also related to the logarithmic conversion of the raw data from the sensor dynamic range scaled to the display medium dynamic range. For instance, in a HeNe laser film system, the usable optical density dynamic range of film exposure, taking into account base plus fog, is 600 to 1. The scale factor SF is defined as:

$$SF=[(\text{Number of available values})/(\text{log of dynamic range})]/\text{Bin size}.$$

For the example given above:

$$SF=[4096/\text{log}(600)]/20 \text{ or } SF=73.7$$

Once a $V_{min}$ value is determined, $V_{max}$ is calculated using one of the following relationships depending on the type of examination selected.

Case I: for general radiographic images. (default value)

A predetermined exam specific dynamic range of digital values can be prescribed to be included in the display data. This mode is the equivalent to using a film with a designed dynamic range of its sensitometric characteristic. The histogram determination of the $V_{min}$ value effectively compensates for exposure variations while the gray scale transfer characteristic will be fixed relative to $V_{min}$. $V_{max}$ is calculated as follows:

$$V_{max}=V_{min}+SF\times\text{Log}(B) \tag{1}$$

where B is the constant paired with constant A.

Case II: (Compensation for Subject Contrast)

For Case II, the difference between $V_{edge}$ and $V_{low}$ is used to determine the dynamic range of the digital data to be used for display. The exam-specific dynamic range parameter from Case I is modified by the ratio of the observed difference ($V_{edge}-V_{low}$) to an exam-specific standard difference in these values. Thus $V_{max}$ is calculated as follows:

$$V_{max}=V_{min}+SF\times\text{Log}(B)-\Delta\text{range} \tag{2}$$

where: $\Delta\text{range}=V_{edge}-V_{low}$
and where $V_{edge}$ is the point in the histogram where the histogram first drops to 20–30%, preferably 25%, of a preceding highest peak as it is scanned from left to right starting at $V_{min}$.

Case III: (Display Value Correlated with Anatomical Structure)

For Case III the $V_{edge}$ value is correlated with anatomical structure in such a way that the structure will be displayed with a prescribed optical density (or soft display intensity) in the diagnostic display. To achieve this, the selected gray scale transfer curve must be referenced.

For example, if $V_{edge}$ corresponds to the maximum translucency of the lung field, it might be prescribed that the $V_{edge}$ value be assigned an optical density (OD) value of 1.7 in the display image. From the gray scale transfer curve it is determined that to obtain an OD=1.7 the exposure given must be 55%. The GST function is normalized such that distance between $V_{edge}$ and $V_{min}$ corresponds to 55% of the digital value range between $V_{max}$ and $V_{min}$. For convenience, we designate this exam-specific exposure percentage parameter "L".

The following equation produces a $V_{max}$ such that $V_{edge}$ will produce the desired optical density in the hard copy image.

$$V_{max}=V_{min}+(1/L)\times(V_{edge}-V_{min}). \quad (3)$$

Case IV: (Case where the area of interest is an extremity.)

In cases where visibility of the skin line is wanted, as for instance in radiographs of extremities, $V_{max}$ is calculated as follows:

$$V_{max}=V_{min}+(1/L)\times(V_{peak}-V_{min}) \quad (4)$$

where L in this case is also an exam-specific parameter referenced to the gray scale transfer curve, and represents the percent exposure needed to produce the desired optical density at the skin line. For this condition the background surrounding the anatomical image will be at the same optical density selected for the skin line.

The previous paragraphs have described our method of determining $V_{min}$ and the various ways of calculating $V_{max}$. These values indicate the range of digital values to be represented in the diagnostic display image. The digital values within this range are transformed via a programmed look-up table (LUT) to provide the desired gray scale transfer characteristic to optimize the display of the diagnostic data.

To reach this point we have used a number of exam specific parameters that are stored in a parameter table and indexed by an operator's choice of image and exam type. These parameters are:

A—for determining $V_{min}$
B—for determining $V_{max}$
L—to produce the desired optical density.

Similarly four algorithms for calculating $V_{max}$, again depending on exam and image type, are stored and selectively used by the operator. Finally the particular display medium Gray Scale Transfer function is also stored in normalized format showing output density as a percentage of exposure. Where more than one display media are used, as is usually the case, then more than one GST function curves are stored.

As also discussed in the aforementioned application, a typical system may include the following parameters that are selected by the operator to display images for different examinations:

| EXAMINATION/IMAGE TYPE INPUT: | 1 Chest - PA/AP |
| | 2 Chest - lateral |
| | 3 Skull |
| | 4 Extremity |

Table 1 provides exemplary constant values for the case described above that uses a histogram of the frequency of occurrence of the log digital values following conversion mapping from the linear 14-bit detector output to the logarithmic 12-bit domain.

TABLE 1

| EXAM TYPE | A | B | Equation No. | L | GST |
|---|---|---|---|---|---|
| 1 | 5 | 100 | 3 | 0.57 | F(ilm) |
| 2 | 5 | 100 | 3 | 0.47 | F |
| 3 | 2 | 70 | 2 | 0.55 | F |
| 4 | 3 | 100 | 4 | 0.55 | F |

"Equation No." as used in Tables 1 and 2, refers to the numbered equations (exam-specific algorithms) in the text of this specification. Table 2 provides exemplary ranges and default values for exam-specific equation coefficients and parameters.

TABLE 2

| PARAMETER | MIN | MAX | DEFAULT |
|---|---|---|---|
| A | 0.1 | 10.0 | 2.0 |
| B | 0.0 | 100 | 100 |
| L | 0.1 | 1.55 | 0.5 |
| Contrast | 0.5 | 1.50 | 1.0 |
| Density | −0.25 | 0.25 | 0.0 |
| Range | 0 | 200 | 53 |
| Anatomical Range | 20 | 200 | 100 |
| Equation No. | 1 | 4 | 1 |

Figure 2:
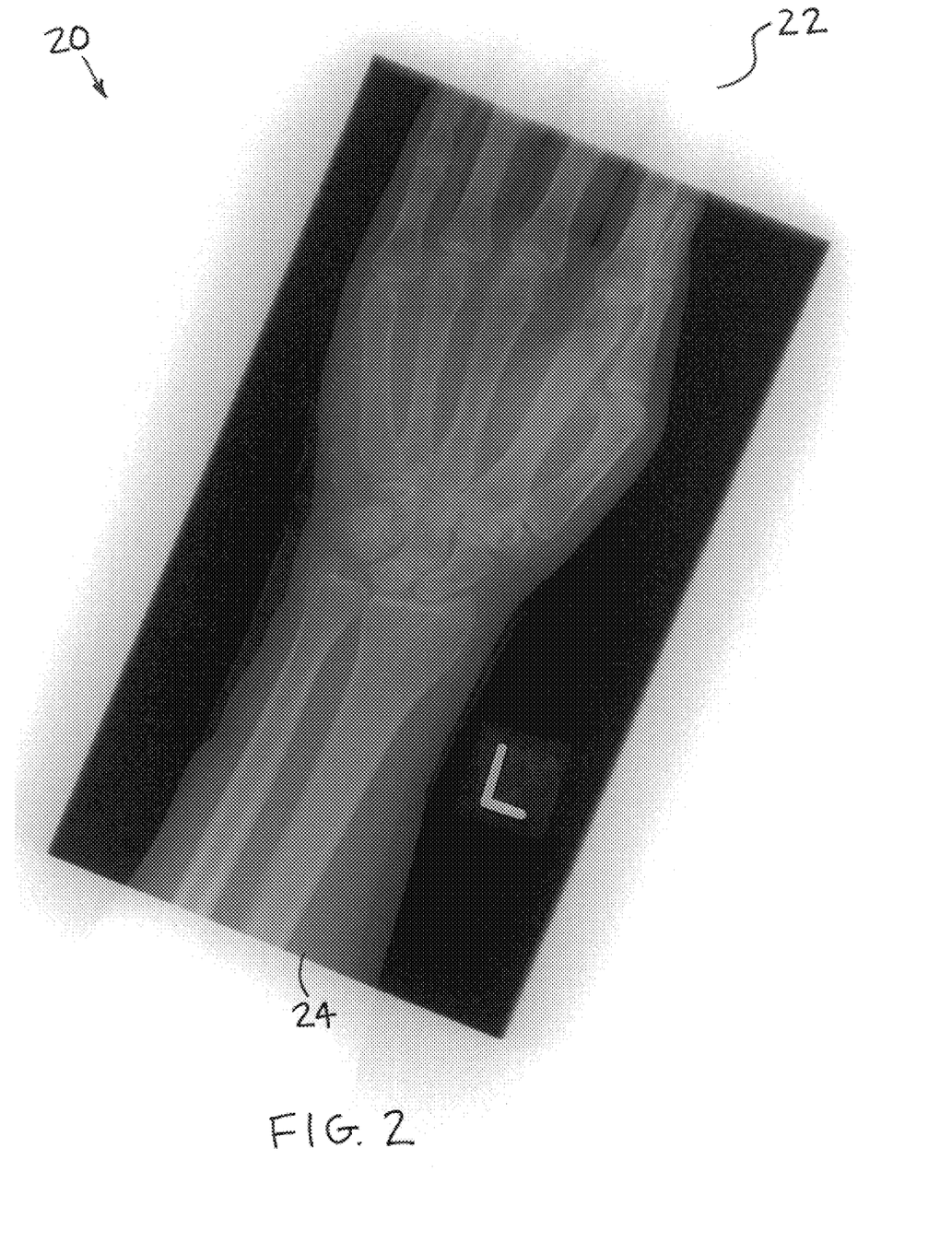
FIG. 2 shows an image resulting from displaying the data represented by the histogram of FIG. 1 after applying a desired exam specific algorithm.

Referring now to FIG. 2, there is shown an image 20 resulting from displaying the data represented by histogram 10 of FIG. 1. Histogram 10 shows the frequency of occurrence of the original set of digital values (following log transformation and mapping onto a 12-bit, 20-values-per-bin domain) representing radiographic image 20 that includes undesirable data. Such undesirable data may, for instance, represent data from outside the actual exposure area as is the case when a collimated radiation beam is used for the exposure of only a portion of a 14×17 inch radiation detector, where shielding prevents the full exposure of the detector but where scattered radiation creates undesirable background exposures 22, as shown in FIG. 2. When data representing this undesirable background exposure is included in the construction of the histogram and the calculation of the $V_{min}$, $V_{max}$ and $V_{edge}$, it tends to skew the results. The resulting image 20, shown in FIG. 2, is of poor quality. Much useful information may be obscured by the scattered radiation image, part of which is seen as the gray area 22 surrounding the desired image area 24.

According to the present invention, we use this original data to extract the aforementioned three values, $V_{low}$, $V_{peak}$ and $V_{edge}$. The present invention also uses a fourth reference value, $V_{test}$, which is the expected minimum data value that is not background scatter. The digital values corresponding to the anatomical data have a defined anatomical range (AR), which is normally about 100 bins (continuing with the histogram construction described above where each bin contains 20 digital values). Thus, the minimum data value that is not background scatter can be calculated as:

$$V_{test}=V_{peak}-AR, \text{ where typically AR=100.}$$

Figure 3:
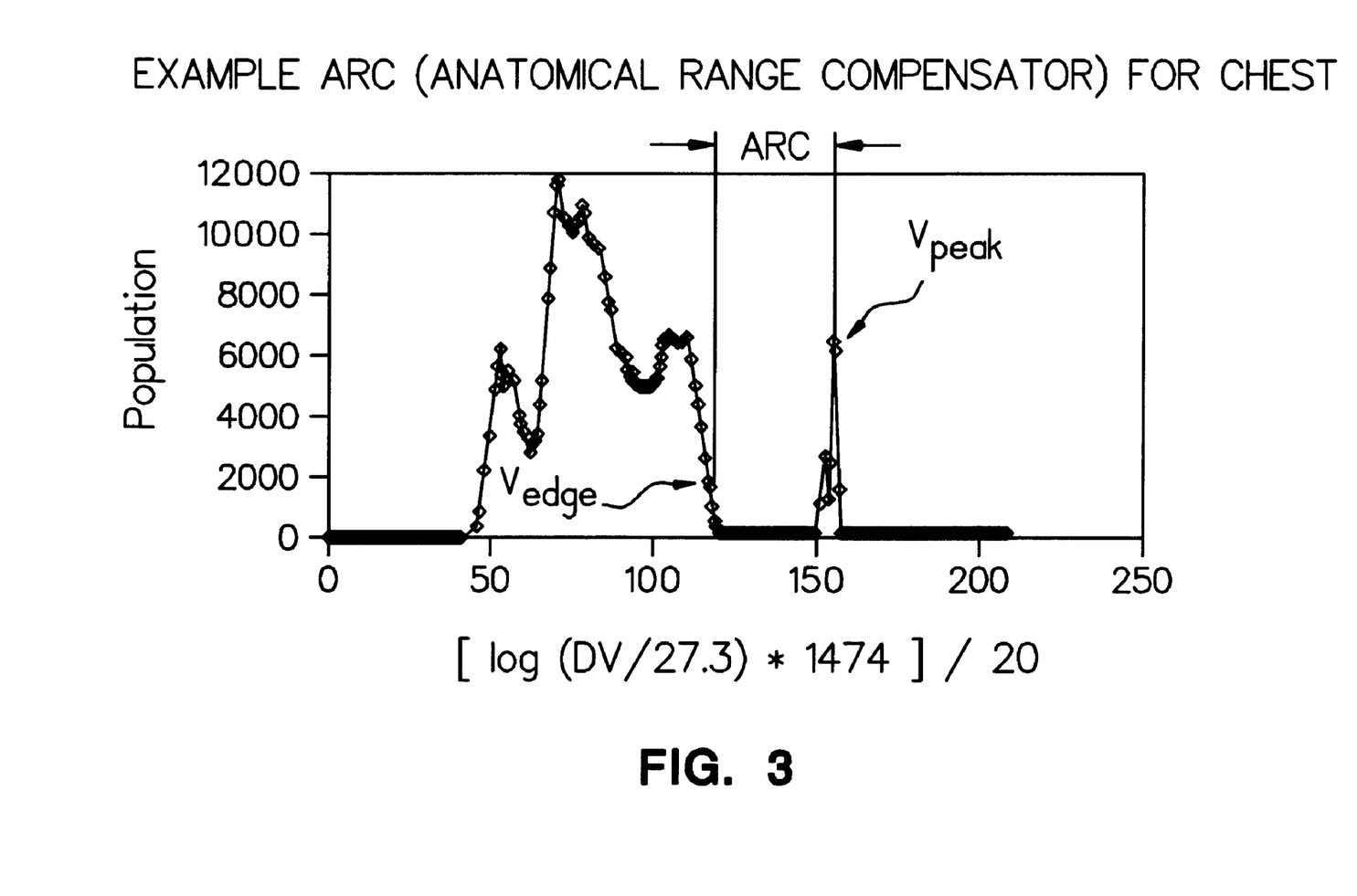
FIG. 3 shows an exemplary histogram illustrating derivation of the anatomical range constant.

However, some examinations may have an abnormal AR that is much greater or lesser than 100:1. This difference in AR can be expressed as a difference in the value of the range $V_{peak}-V_{edge}$ for a normal versus an abnormal examination for each examination type. This range can be referred to as the ARC (anatomic range compensation), and is illustrated in FIG. 3. Each examination has an $ARC_{ref}$ (reference ARC) value, which can be estimated from a large distribution of histograms from a large clinical database, and an $ARC_{act}$ (actual ARC) corresponding to the actual $V_{peak}-V_{edge}$ for the specific histogram being processed.

Thus, AR can be expressed:

$$AR = \text{Fixed range} + (ARC_{act} - ARC_{ref}), \text{ where}$$

$$ARC_{act} = V_{peak} - V_{edge}$$

So, taking anatomical range AR compensation into account:

$$V_{test} = V_{peak} - [\text{Fixed range} + \{(V_{peak} - V_{edge}) - ARC_{ref}\}]$$

Again for the preferred embodiment used to illustrate this process, the fixed range value has been experimentally determined to be 100. Depending on the histogram scale, the fixed range may be adjusted to represent an experimentally determined value range that is typical of the useful range of values (and therefore gray scale range) that are expected for a particular exam type.

For a fixed range of 100, the previous equation becomes:

$$V_{test} = V_{peak} - [100 + \{(V_{peak} - V_{edge}) - ARC_{ref}\}]$$

In accordance with the present invention, the filtered histogram, that is the histogram of values that will be used for identifying the data values to be used in displaying the radiograph, is constructed by first compiling a preliminary full-image histogram and corresponding integral curve. We next determine the point $V_{peak1}$ on that integral curve and obtain $V_{test}$. Next, the full image is divided into multiple subimages in the form of two-dimensional square or rectangular blocks of pixels. A histogram for each block and an integral curve of the block histogram are then constructed. Reference point $BV_{low}$, corresponding to 1% to 10%, preferably 5% of the block integral, is then generated for each block, and compared to $V_{test}$. A filtered, full image, histogram is then created consisting of the summation of all the data from only those blocks in which $BV_{low}$ is greater than $V_{test}$. The filtered histogram so created is then used for the determination of $V_{low}$, $V_{peak2}$, and $V_{edge}$, as described above, and from these values, $V_{min}$ and $V_{max}$ are determined for displaying the image. The designations $V_{peak1}$ and $V_{peak2}$ are used herein to differentiate the $V_{peak}$ determined on the preliminary full image histogram ($V_{peak1}$) from the $V_{peak}$ determined on the filtered full-image histogram ($V_{peak2}$).

Once the $V_{min}$, $V_{edge}$ and $V_{max}$ of the filtered histogram have been determined, the operator inputs selects the type of image to be displayed and the range of useful values to be displayed ($V_{max} - V_{min}$). As each value is next brought up for display it is transformed to a percentage of exposure value. This percentage value is translated using the stored lookup table (LUT), corresponding to the display medium density transfer as a function of normalized exposure, to generate a value for the resulting exposure needed to produce the desired optical density. This value is then used to expose the display medium if such medium is photosensitive film, or to drive a CRT display device if a soft display is to be used.

Figure 4:
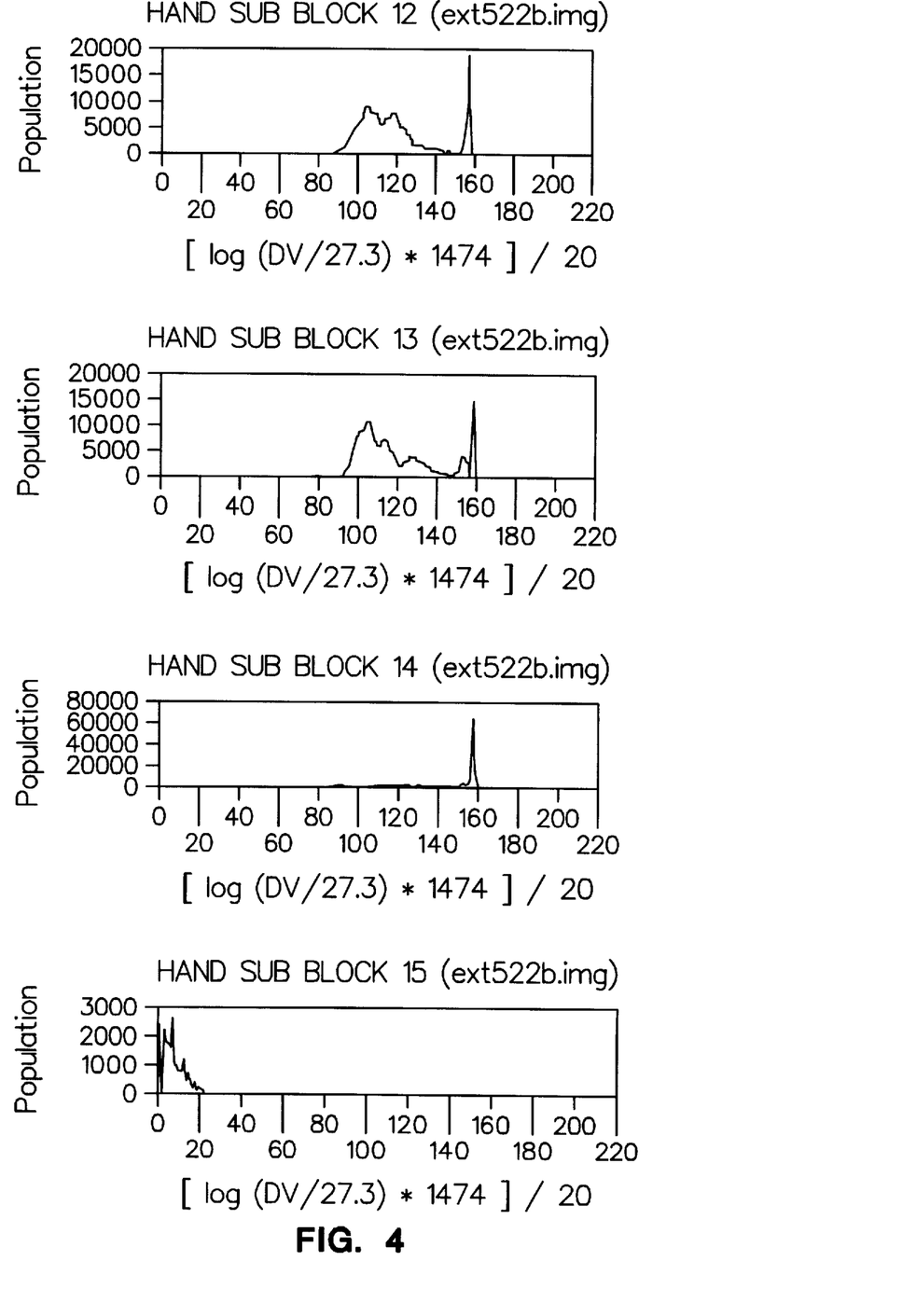
FIG. 4 shows typical block histograms from the same data used in constructing the histogram of FIG. 1.

Referring now to the drawings, FIG. 4 shows typical histograms of the frequency of occurrence of the digital values for a number of the blocks into which the original image is subdivided. Each of these sub-histograms has a corresponding $V_{low}$ that is obtained and tested against the $V_{test}$ from the original histogram.

Figure 5:
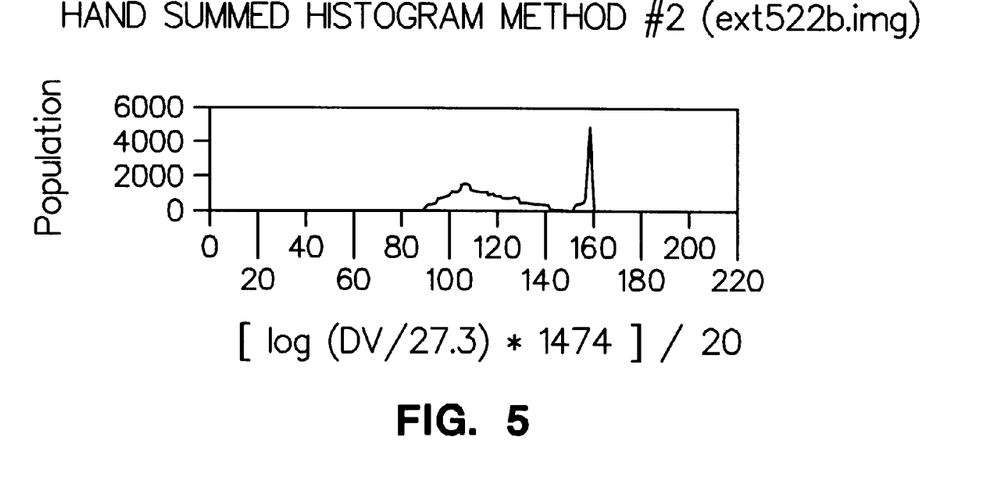
FIG. 5 shows the resulting filtered histogram corresponding to the histogram of FIG. 1 after application of the data processing according to this invention.
Figure 6:
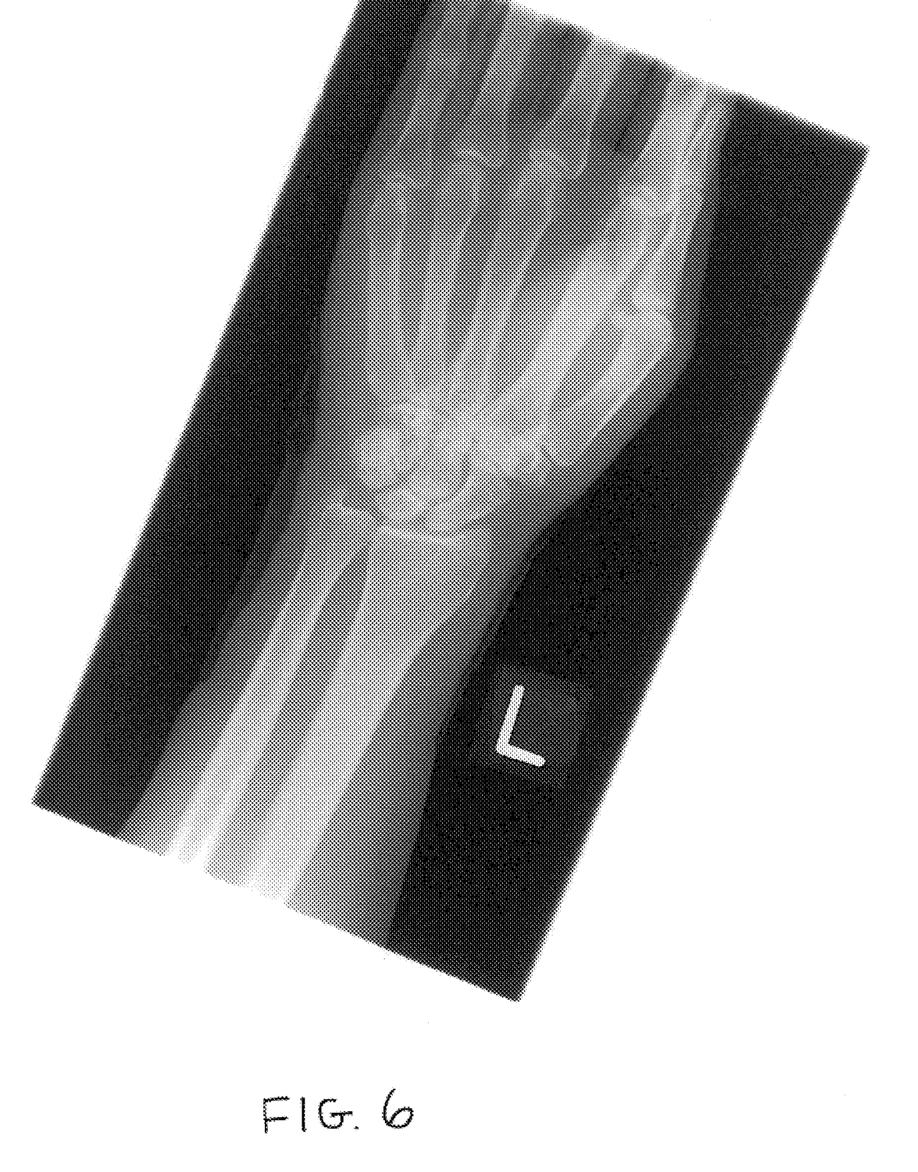
FIG. 6 shows an image resulting from displaying the data represented by the filtered histogram of FIG. 5 after applying the same desired exam specific algorithm as in the case of FIG. 2.

FIG. 5 shows the filtered histogram obtained by keeping for its construction only digital values from block subset histograms where $BV_{low}$ is greater than $V_{test}$. As can be seen in FIG. 5, values corresponding to bins below about bin 85 on the x-axis are no longer included. FIG. 6 shows the image of the hand resulting from the use of the data represented by the filtered histogram of FIG. 5, following application of the same exam-specific algorithm (ESA) selection used to display the image in FIG. 2.

While the conversions and calculations may be done in hardware, or with operator input at various operating stages, the computational portion of this process may best be done using an appropriately programmed computer. Thus, this invention also comprises a program storage device readable by a machine, tangibly embodying a program of instructions executable by the machine to perform the aforementioned method steps, particularly where such machine is a component of a digital radiography system.

Figure 7:
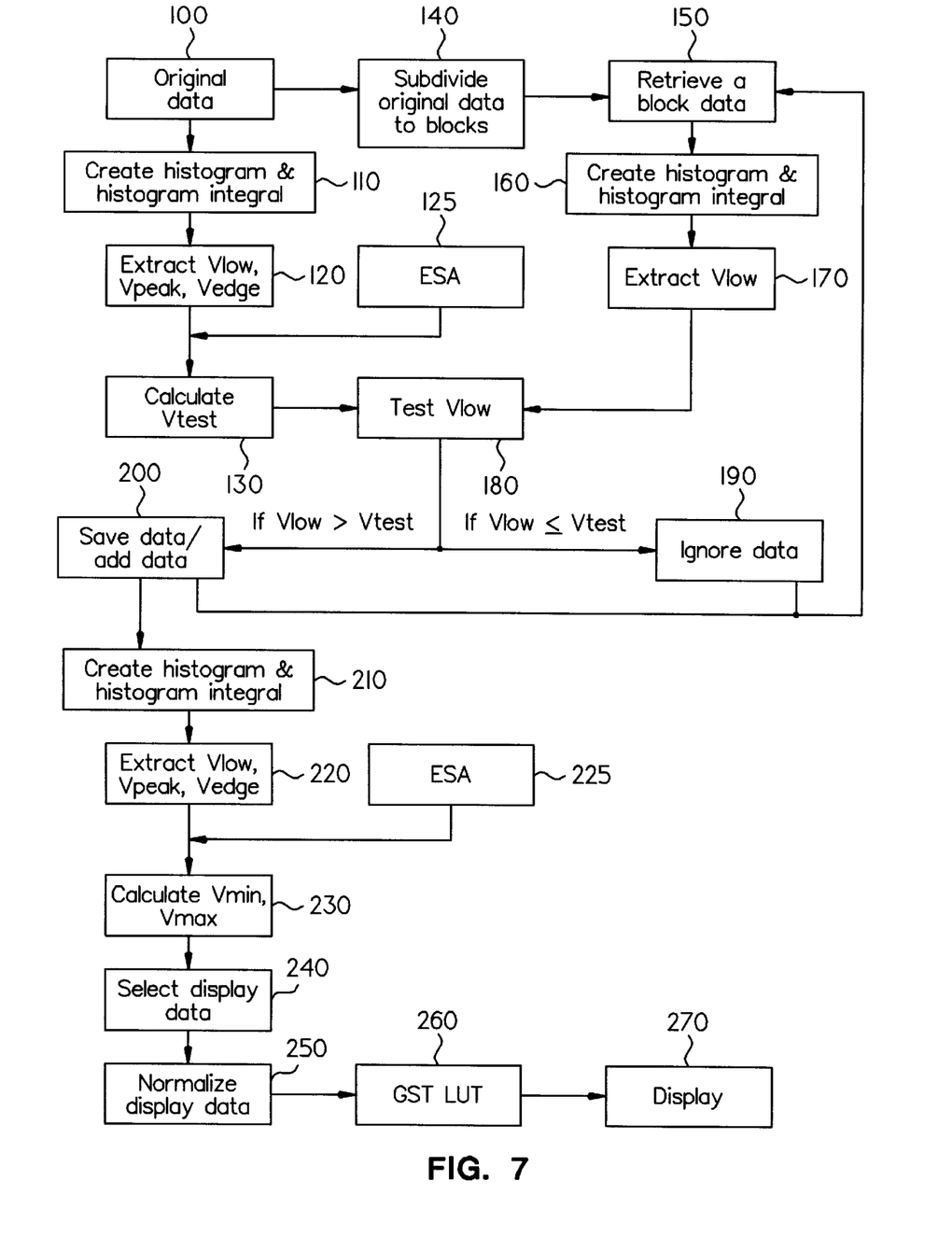
FIG. 7 shows a flow diagram of an exemplary method of this invention.

Referring now to FIG. 7, there is shown an exemplary flow diagram that may be used in the computer logic of such program. As shown in FIG. 7, the process flow begins at step 100 with collection of the original digital radiographic data. The histogram in histogram integral of that data is created in step 110, and the $V_{low}$, $V_{peak1}$ and $V_{edge}$ reference values are determined. Next, in step 130, using an Exam-Specific Algorithm (ESA) 125, $V_{test}$ is calculated.

Then, in step 140, the original digital data is subdivided into blocks. In step 150, the data for a specific block is retrieved, and the histogram and histogram integral for that block are created in step 160. The block $V_{low}$ ($BV_{low}$) is calculated in step 170, and compared to $V_{test}$ in step 180. If $V_{low}$ is less than or equal to $V_{test}$, the data is ignored in step 190. If $V_{low}$ is greater than $V_{test}$, the data is saved/added to the filtered subset of data in step 200. Steps 150 through step 190 or step 200, depending on the results of step 180, are repeated until all blocks of data have been retrieved and evaluated.

Once the complete filtered subset of data has been created, the process continues in step 210, where the filtered histogram and filtered histogram integral of the filtered subset of data are created. $V_{low}$, $V_{peak2}$ and $V_{edge}$ are created in step 220, and the ESA 225 is used for calculating $V_{min}$ and $V_{max}$. The display data is created in step 240 by replacing values in the filtered subset below $V_{min}$ with $V_{min}$ and above $V_{max}$ with $V_{max}$, and that display data is normalized in step 250. The normalized display data is processed through a Gray-Scale Transfer (GST) Look-up table (LUT) in step 260 to create the visible display in step 270.

It is obvious that those skilled in the art having the benefit of the above description can make numerous modifications thereto, particularly as to the actual numerical values used in the examples given above. Such modifications may an include operator input step where an operator may select a desired ESA or define the type of examination which may control the selection of $V_{edge}$, $V_{low}$ or $V_{peak}$ or any other input which relates to the type of examination undertaken or the nature of the patient. Any such modifications are to be construed as encompassed within the scope of my invention as hereinbelow claimed.

I claim:

1. A method for automatically forming a filtered subset of digital values from a first set of digital values corresponding to a plurality of picture elements representing a radiographic exposure of a subject for use in displaying a radiograph of said subject, the method comprising:

(1) generating a first histogram representing a frequency of occurrence of digital values within the first set of digital values;

(2) generating an integral curve representing an integral of said first histogram;

(3) obtaining a digital value $V_{peak1}$, corresponding to an inflection point on the first histogram integral curve where the integral curve first changes slope starting from a point of highest digital value and traversing along the integral curve in the direction of decreasing digital values;

(4) calculating a parameter $V_{test}=V_{peak1}-AR$ wherein AR is a parameter that represents an anatomical range of said subject;

(5) spatially dividing the first set of digital values into multiple block subsets of digital values, each block subset comprising digital values from a neighborhood of pixels consisting of a predetermined number of picture elements;

(6) constructing a block subset histogram representing a frequency of occurrence of digital values within each block subset;

(7) determining on each block subset a digital value $BV_{low}$, corresponding to a predetermined low point of the block subset histogram;

(8) comparing each $BV_{low}$ to $V_{test}$; and (9) forming said filtered subset of digital values from the digital values of all the block subsets having $BV_{low}$ greater than $V_{test}$.

2. The method according to claim 1 wherein the step of determining a low point on each block subset of digital values includes obtaining a block subset histogram integral curve for each of said block subset histograms and setting $BV_{low}$ in a range of between 1% to 10% of the integral curve.

3. The method according to claim 1 wherein in calculating $V_{test}$ there is applied to the set of digital values an exam-specific algorithm.

4. The method according to claim 1 wherein in calculating $V_{test}$ there is applied to the set of digital values a preselected one of a plurality of exam specific algorithms.

5. The method according to claim 1 wherein in calculating $BV_{low}$ there is applied to the subset of digital values an exam specific algorithm.

6. The method according to claim 1 further comprising obtaining a digital value $V_{edge}$, corresponding to an edge point on said first histogram where the frequency of occurrence first drops to a predetermined percentage of a preceding peak frequency of occurrence when traversing along the histogram starting from $V_{low}$ in a direction of increasing exposure, wherein $AR=[100+\{(V_{max}-V_{edge})-ARC_{ref})\}]$, where $ARC_{ref}$ is an experimentally derived constant.

7. The method according to claim 6 wherein $ARC_{ref}$ represents a standard value for $V_{max}-V_{edge}$ for a predetermined exam, type, said standard value derived from a representative distribution of histograms from a representative clinical database.

8. The method according to claim 1 further comprising displaying on a display medium an image representing the radiograph by:

I) storing in a memory a first normalized lookup table (LUT) representing a density transfer function for the display medium;

II) storing in said memory a second LUT containing a plurality of experimentally determined constants characteristic of the type of image to be displayed;

III) forming a filtered histogram representing a frequency of occurrence of digital values within said filtered subset of digital values and generating an integral curve representing an integral of said filtered histogram; obtaining a digital value $V_{low}$ corresponding to a low point on the filtered histogram integral curve at a predetermined low percentage of the filtered histogram integral; obtaining a digital value $V_{edge}$ corresponding to an edge point on the filtered histogram where the filtered histogram frequency of occurrence first drops to a predetermined percentage of a preceding peak frequency of occurrence when traversing along the filtered histogram starting from $V_{low}$ in the direction of increasing exposure; obtaining a digital value $V_{peak2}$, corresponding to a point on the filtered histogram integral curve where the filtered histogram integral curve first changes slope when traversing along the filtered histogram integral curve starting from the point of highest exposure in the direction of decreasing exposure; and calculating a starting value $V_{min}$ and an ending value $V_{max}$ using a exam-specific equation containing said experimentally determined constants and one or more of the values $V_{low}$, $V_{peak2}$ and $V_{edge}$;

IV) replacing all digital values in the filtered subset which are lower than $V_{min}$ with $V_{min}$, and all digital values which are higher than $V_{max}$, by $V_{max}$; and V) normalizing the digital values in the filtered subset to a new set of values representing the difference $V_{max}-V_{min}$ and using the normalized digital values and the first LUT to display the image.

9. A program storage device readable by a machine, tangibly embodying a program of instructions executable by the machine to perform the method steps for automatically forming a filtered subset of digital values from a set of digital values corresponding to a plurality of picture elements representing a radiographic exposure of a subject for use in displaying a radiograph of said subject, said method steps comprising:

(1) generating a first histogram of the set of digital values;

(2) generating an integral curve representing an integral of said first histogram;

(3) identifying an inflection point on the first histogram integral where the integral curve first changes slope when traversing along the integral curve starting from a point of highest digital value in the direction of decreasing digital values and obtaining a digital value $V_{peak1}$ for the inflection point;

(4) calculating a parameter $V_{test}=V_{peak1}-AR$ wherein AR is a constant representing an anatomical range of said subject;

(5) spatially dividing the set of digital values into multiple block subsets of digital values, each block subset comprising digital values from a neighborhood of pixels consisting of a predetermined number of picture elements;

(6) constructing a subset histogram representing the frequency of occurrence of digital values within each block subset;

(7) determining a low point on each block subset, $BV_{low}$, corresponding to a predetermined low point of the block subset histogram;

(8) comparing each $BV_{low}$ to $V_{test}$; and (9) forming said filtered subset of digital values from the digital values of all the block subsets having $BV_{low}$ greater than $V_{test}$.

10. The program storage device according to claim 9, wherein the method further comprises displaying on a display medium an image representing the radiograph by:

I) storing in a memory a first normalized lookup table (LUT) representing a density transfer function for the display medium;

II) storing in said memory a second LUT containing a plurality of experimentally determined constants characteristic of the type of image to be displayed;

III) forming a filtered histogram representing a frequency of occurrence of digital values within said filtered subset of digital values and generating an integral curve representing an integral of said filtered histogram; obtaining a digital value $V_{low}$ corresponding to a low point on the filtered histogram integral curve at a predetermined low percentage of the filtered histogram integral; obtaining a digital value $V_{edge}$ corresponding to an edge point on the filtered histogram where the filtered histogram frequency of occurrence first drops to a predetermined percentage of a preceding peak frequency of occurrence when traversing along the filtered histogram starting from $V_{low}$ in the direction of increasing exposure; obtaining a digital value $V_{peak2}$, corresponding to a point on the filtered histogram integral curve where the filtered histogram integral curve first changes slope when traversing along the filtered histogram integral curve starting from the point of highest exposure in the direction of decreasing exposure; and calculating a starting value $V_{min}$ and an ending value $V_{max}$ using a exam-specific equation containing said experimentally determined constants and one or more of the values $V_{low}$, $V_{peak2}$ and $V_{edge}$;

IV) replacing all digital values in the filtered subset which are lower than $V_{min}$ with $V_{min}$, and all digital values which are higher than $V_{max}$, by $V_{max}$; and V) normalizing the digital values in the filtered subset to a new set of values representing the difference $V_{max} - V_{min}$ and using the normalized digital values and the first LUT to display the image.

11. The program storage device according to claim 9, wherein said machine is a component in a digital radiography system.

12. The program storage device according to claim 10, wherein said machine is a component in a digital radiography system.

* * * * *